(12) United States Patent
Zhang et al.

(10) Patent No.: US 10,042,237 B1
(45) Date of Patent: Aug. 7, 2018

(54) PROJECTOR FOR PROJECTING AN IMAGE HAVING A FIREWORK EFFECT

(71) Applicant: GEMMY INDUSTRIES CORPORATION, Coppell, TX (US)

(72) Inventors: Cheng Chun Zhang, Shenzhen (CN); Lio Yenwei Chang, Coppell, TX (US)

(73) Assignee: GEMMY INDUSTRIES CORPORATION, Coppell, TX (US)

( * ) Notice: Subject to any disclaimer, the term of this patent is extended or adjusted under 35 U.S.C. 154(b) by 0 days.

(21) Appl. No.: 15/678,404

(22) Filed: Aug. 16, 2017

(51) Int. Cl.
G03B 21/14 (2006.01)
G03B 31/00 (2006.01)
G03B 21/20 (2006.01)

(52) U.S. Cl.
CPC ......... *G03B 21/142* (2013.01); *G03B 21/145* (2013.01); *G03B 21/208* (2013.01); *G03B 21/2093* (2013.01); *G03B 31/00* (2013.01)

(58) Field of Classification Search
CPC .. G03B 21/142; G03B 21/145; G03B 21/208; G03B 21/00
USPC ............................................. 353/15, 1, 101
See application file for complete search history.

(56) References Cited

FOREIGN PATENT DOCUMENTS

JP 2011008185 A * 1/2011 ............. G03B 21/00

OTHER PUBLICATIONS

Machine Translation of Japanese Application Publication 2011008185 A.*

* cited by examiner

*Primary Examiner* — Steven N Whitesell Gordon
*Assistant Examiner* — Jerry Brooks
(74) *Attorney, Agent, or Firm* — Lynette Wylie; Apex Juris, pllc.

(57) ABSTRACT

A projector has a body, a control device, a driving assembly, and a light device. The control device is mounted in the body. The driving assembly is mounted in the body and has a holding frame, a driving unit, and a transmitting unit. The holding frame has a central tube. The driving unit is electrically connected with the control device, and has a casing, a driving device, a rotating axle, a gear assembly, two limiting switches and an eccentric wheel. The light device is mounted on the holding frame, is electrically connected with the control device, and has a main light unit, a pattern film, and multiple auxiliary light units.

20 Claims, 8 Drawing Sheets

PROJECTOR FOR PROJECTING AN IMAGE HAVING A FIREWORK EFFECT

BACKGROUND OF THE INVENTION

1. Field of the Invention

The present invention relates to a projector, and more particularly to a projector that can project an image with expanding dimensions as a firework.

2. Description of Related Art

A conventional projector can project a moveable image to improve the visual effect and comprises a body, a driving device, a rotating axle, a light unit, and a pattern film. The driving device is mounted in the body, and the rotating axle is mounted on the driving device. The light device is mounted on the rotating axle, and the pattern film is mounted in the body. The rotating axle is driven by the driving device to rotate, and the light device is rotated with the rotating axle. With such an arrangement, the projector can project a moveable light image. Alternatively, the light device is mounted in the body, and the pattern film is mounted on the rotating axle. Accordingly, the projector can project a moveable pattern image.

However, although the light or pattern image projected from the conventional projector is moveable, the dimensions of the light or pattern image are not variable. The conventional projector cannot project an image having various dimensions as a firework. When a firework is launched into the sky and exploded, the dimensions of the image of the firework will gradually expand. However, the conventional projector cannot project an image having various dimensions as a firework.

To overcome the shortcomings, the present invention tends to provide a projector to mitigate or obviate the aforementioned problems.

SUMMARY OF THE INVENTION

The main objective of the invention is to provide a projector that can project an image with expanding dimensions as a firework.

The projector has a body, a control device, a driving assembly, and a light device. The body has a housing and a cover. The housing has a chamber defined in the housing and an opening defined in the housing and communicating with the chamber. The cover is transparent and is attached to the housing to close the opening. The control device is mounted in the chamber of the housing. The driving assembly is mounted in the chamber of the housing and has a holding frame, a driving unit, and a transmitting unit. The holding frame is mounted in the chamber of the housing and has a central tube formed on the holding frame. The driving unit is mounted on the holding frame, is electrically connected with the control device, and has a casing, a driving device, a rotating axle, a gear assembly, two limiting switches, and an eccentric wheel. The casing is mounted on the holding frame. The driving device is mounted on the casing and is electrically connected with the control device. The rotating axle is rotatably connected with the driving device and has multiple teeth formed around the rotating axle. The gear assembly is mounted in the casing and is engaged with the teeth on the rotating axle. The limiting switches are mounted on an outer surface of the casing and are electrically connected with the control device. The eccentric wheel is rotatably mounted on the outer surface of the casing, is connected with the gear assembly, and has a pushing tab. The pushing tab is mounted on the eccentric wheel and is selectively in contact with the two limiting switches. The transmitting unit is mounted on the holding frame and has an upper lever, a front base, a lower lever, and a rear base. The upper lever is connected with the eccentric wheel. The front base is connected with the upper lever, is held moveably in the central tube of the holding frame, and has a front lens. The lower lever is connected with the eccentric wheel. The rear base is connected with the lower lever, is held moveably in the central tube of the holding frame, and has a rear lens. The light device is mounted on the holding frame, is electrically connected with the control device, and has a main light unit, a pattern film, and multiple auxiliary light units. The main light unit is mounted on the holding frame and is aligned with the central tube. The pattern film is disposed between the main light unit and the central tube. The auxiliary light units are mounted on the holding frame at spaced intervals and are arranged around the main light unit.

Other objects, advantages and novel features of the invention will become more apparent from the following detailed description when taken in conjunction with the accompanying drawings.

DETAILED DESCRIPTION OF PREFERRED EMBODIMENT

Figure 1:
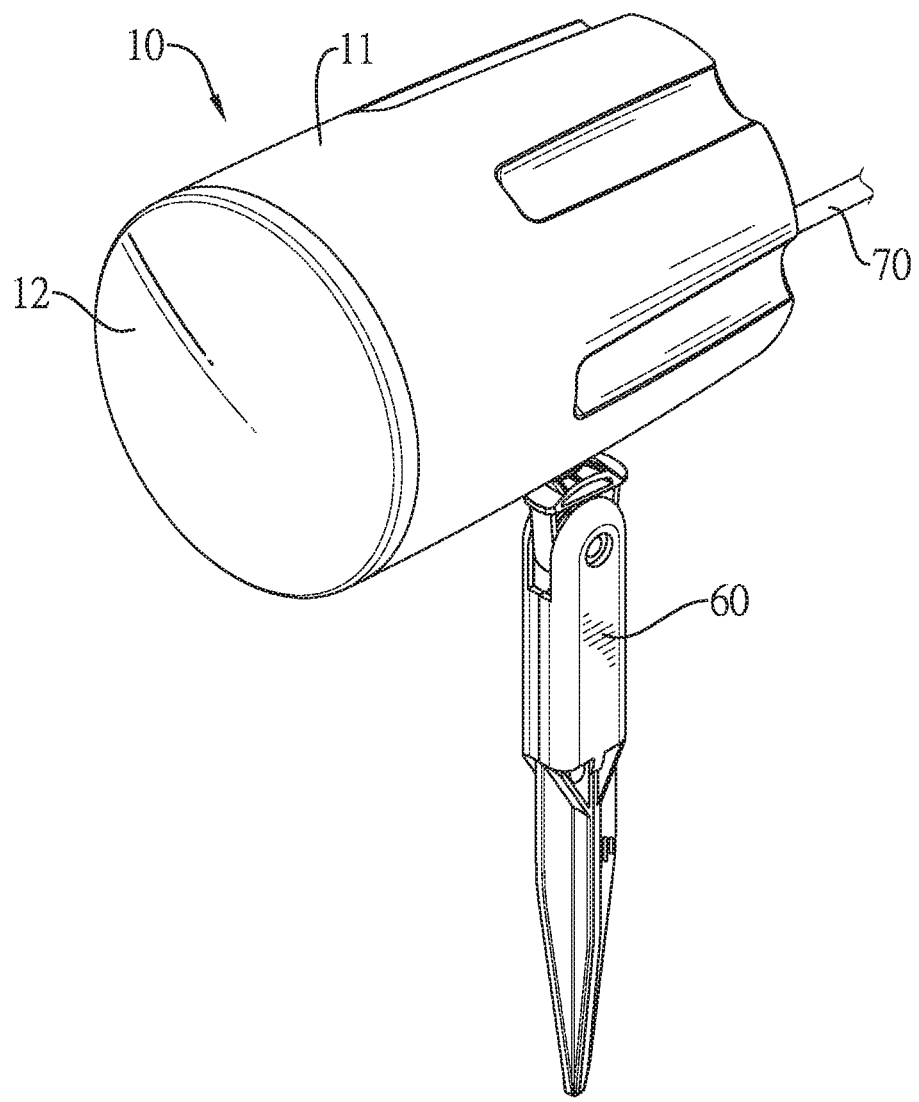
FIG. 1 is a perspective view of a projector in accordance with the present invention.
Figure 2:
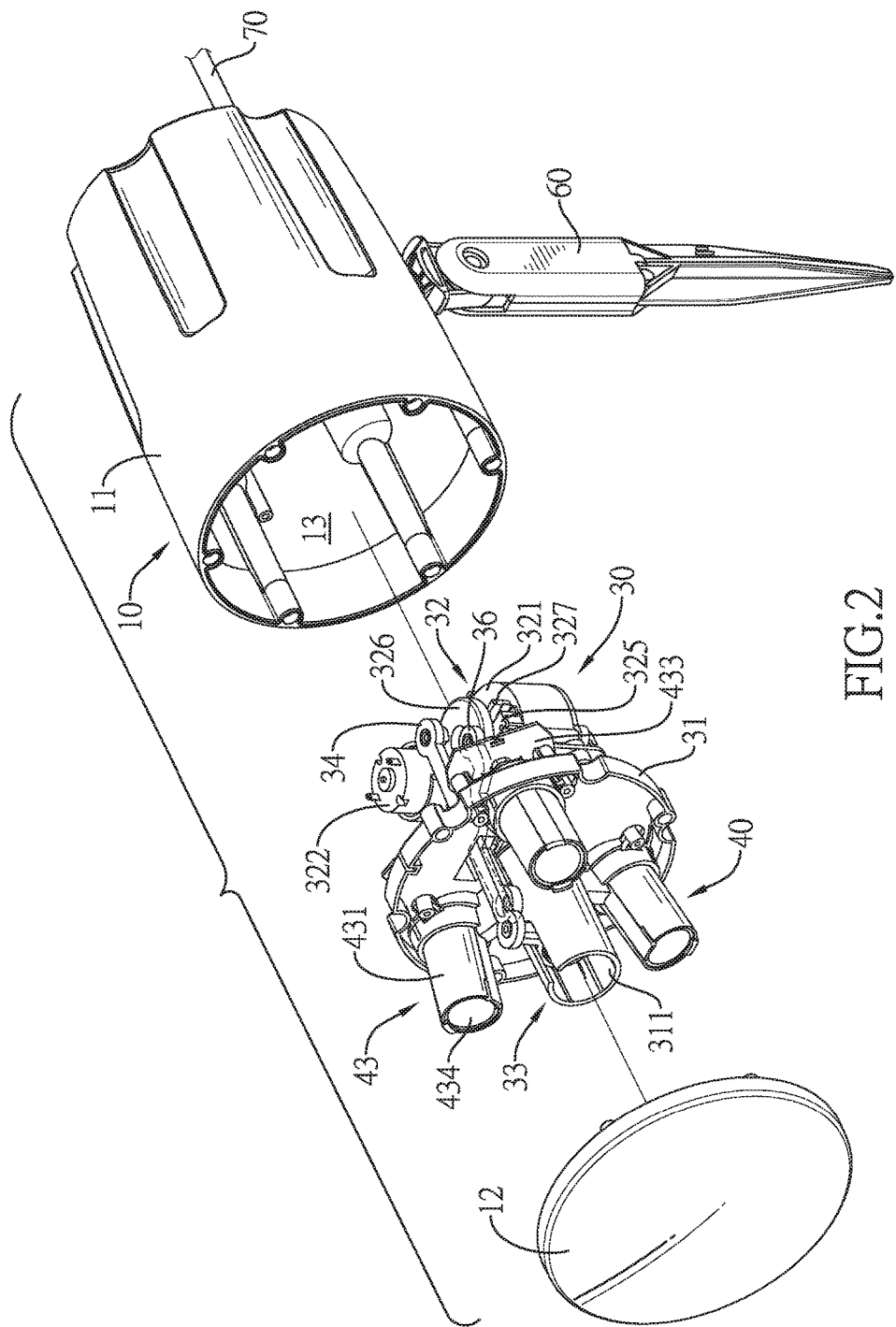
FIG. 2 is an exploded perspective view of the projector in FIG. 1.

With reference to FIG. 1, a projector in accordance with the present invention comprises a body 10, a control device 20, a driving assembly 30, and a light device 40. In addition, the projector may further comprise a sound device 50 and a supporting device 60.

The body 10 comprises a housing 11 and a cover 12. The housing 11 has a chamber 13 and an opening. The chamber 13 is defined in the housing 11, and the opening is defined in an end of the housing 11 and communicates with the chamber 13. The cover 12 is attached to the housing 11 to close the opening to form the chamber 13 as a closed space. The cover 12 is transparent and water-proof.

The control device 20 is mounted in the chamber 13 of the housing 11.

With reference to FIGS. 3 to 5 and 8, the driving assembly 30 is mounted in the chamber 13 of the housing 11 and comprises a holding frame 31, a driving unit 32, and a transmitting unit 33. The holding frame 31 is mounted in the chamber 13 of the housing 11 and has a central tube 311 formed on and protruding from a side of the holding frame 31. The driving unit 32 is mounted on the holding frame 31, is electrically connected with the control device 20, and has a casing 321, a driving device 322, a rotating axle 323, a gear assembly 324, two limiting switches 325, and an eccentric wheel 326. The casing 321 is hollow and is mounted on the holding frame 31. The driving device 322 is mounted on the casing 321 and is electrically connected with the control device 20. The rotating axle 323 is rotatably connected with the driving device 322 and has multiple teeth formed around the rotating axle 323. The gear assembly 324 is mounted in the casing 321 and is engaged with the teeth on the rotating axle 323. The limiting switches 325 are mounted on an outer surface of the casing 321 and are electrically connected with the control device 20. The eccentric wheel 326 is rotatably mounted on the outer surface of the casing 321, is connected with the gear assembly 324, and has a pushing tab 327. The pushing tab 327 is mounted on a bottom of the eccentric wheel 326 and is selectively in contact with the two limiting switches 325. The transmitting unit 33 is mounted on the holding frame 31 and comprises an upper lever 34, a front base 35, a lower lever 36, and a rear base 37. The upper lever 34 is pivotally connected with the eccentric wheel 326 and extends moveably through the holding frame 31. The front base 35 is pivotally connected with the upper lever 34, is held moveably in the central tube 311 of the holding frame 31, and has a front lens. The lower lever 36 is pivotally connected with the eccentric wheel 326 and extends moveably through the holding frame 31. The rear base 37 is pivotally connected with the lower lever 36, is held moveably in the central tube 311 of the holding frame 31, and has a rear lens.

With reference to FIGS. 3, 5, 6, and 8, the light device 40 is mounted on the holding frame 31, is electrically connected with the control device 20, and comprises a main light unit 41, a pattern film 42, and multiple auxiliary light units 43. The main light unit 41 is mounted on the holding frame 31 and is aligned with the central tube 311. The pattern film 42 is disposed between the main light unit 41 and the central tube 311. The multiple auxiliary light units 43 are mounted on the holding frame 31 at spaced intervals and are arranged around the main light unit 41. Preferably, three auxiliary light units 43 are implemented. The main light unit 41 comprises a main light shade 411 and a main light element 412. The main light shade 411 is mounted on the holding frame 31. The main light element 412 is mounted on the main light shade 411 and is aligned with the central tube 311. The main light element 412 may be a light-emitting diode (LED). Each auxiliary light unit 43 comprises a lens sleeve 431, a light-concentrating shade 432, and an auxiliary light element 433. The lens sleeve 431 is mounted through the holding frame 31 and has an image lens 434. The light-concentrating shade 432 is mounted on the lens sleeve 431. The auxiliary light element 433 is mounted on the light-concentrating shade 432 and is aligned with the lens sleeve 431. The auxiliary light element 433 may be a light-emitting diode (LED).

Figure 3:
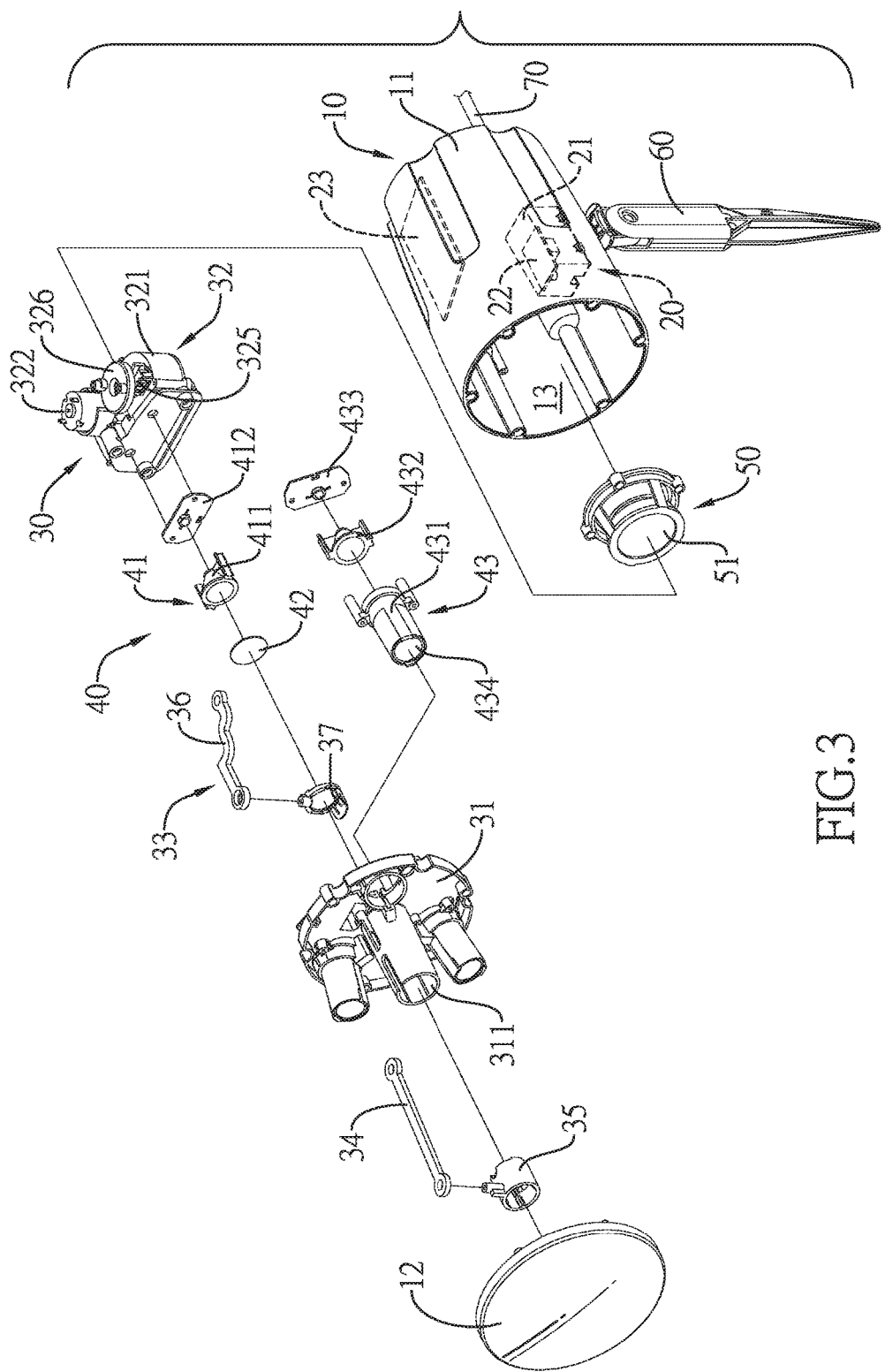
FIG. 3 is another exploded perspective view of the projector in FIG. 1.
Figure 5:
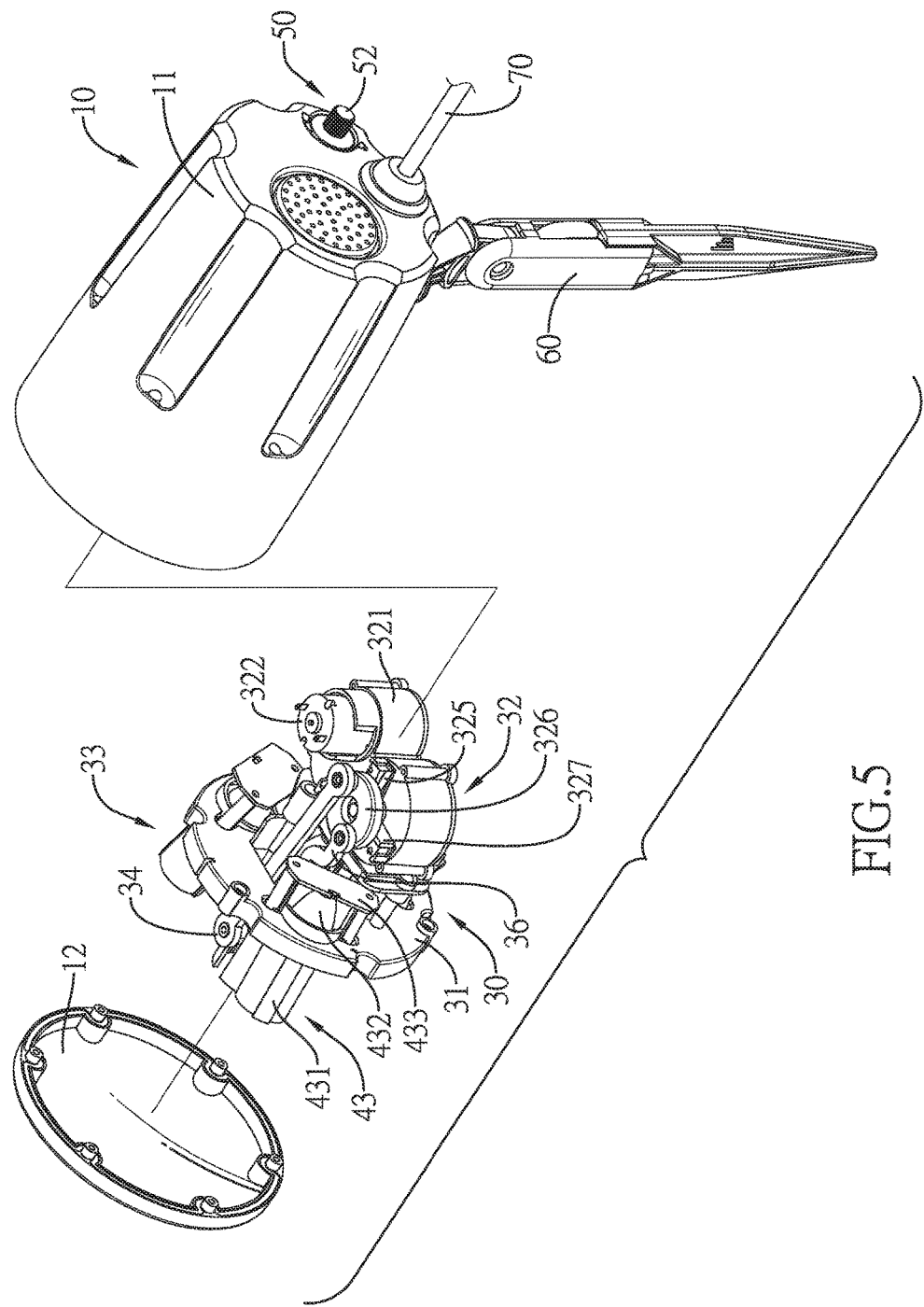
FIG. 5 is another exploded perspective view of the projector in FIG. 1.
Figure 6:
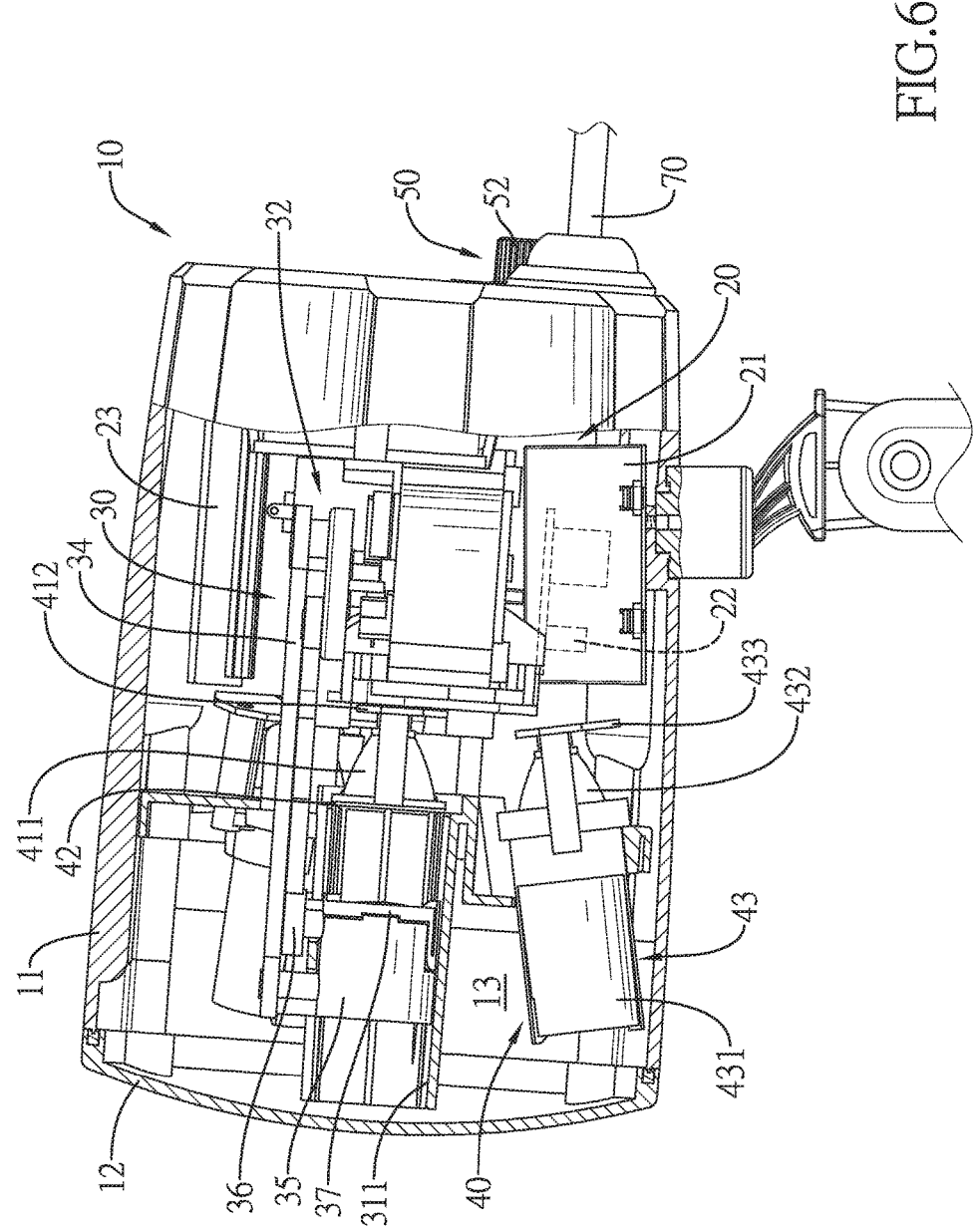
FIG. 6 is an enlarged side view in partial section of the projector in FIG. 1.
Figure 8:
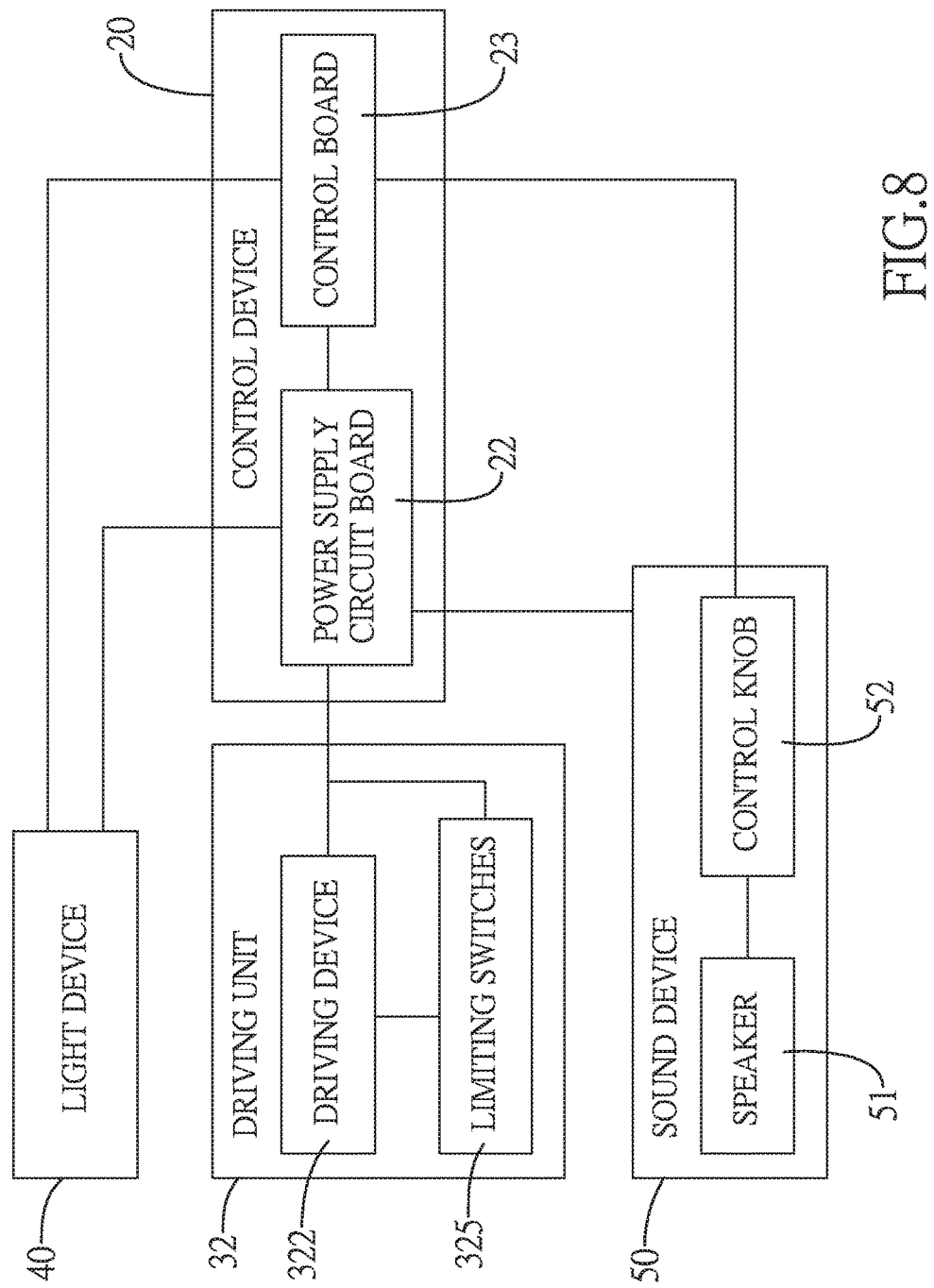
FIG. 8 is a block diagram showing the electrical connections of the projector in FIG. 1

With reference to FIGS. 3, 5, and 8, the sound device 50 is mounted on a rear end of the body 10, is electrically connected with the control device 20, and comprises a speaker 51 and a control knob 52. The speaker 51 is mounted in the chamber 13 of the housing 11. The control knob 52 is electrically connected with the speaker 51 and protrudes out of the housing 11.

The supporting device 60 is mounted on a bottom of the housing 11. The supporting device 60 may be a tripod or a ground insert.

With reference to FIG. 3, the control device 20 comprises a power supply box 21, a power supply circuit board 22, and a control board 23. The power supply box 21 is mounted in the housing 11. The power supply circuit board 22 is mounted in the power supply box 21 and is electrically connected with the driving unit 32, the light device 40, and the sound device 50. The control board 23 is mounted in the housing 11, and is electrically connected with the light device 40 and the sound device 50.

Figure 4:
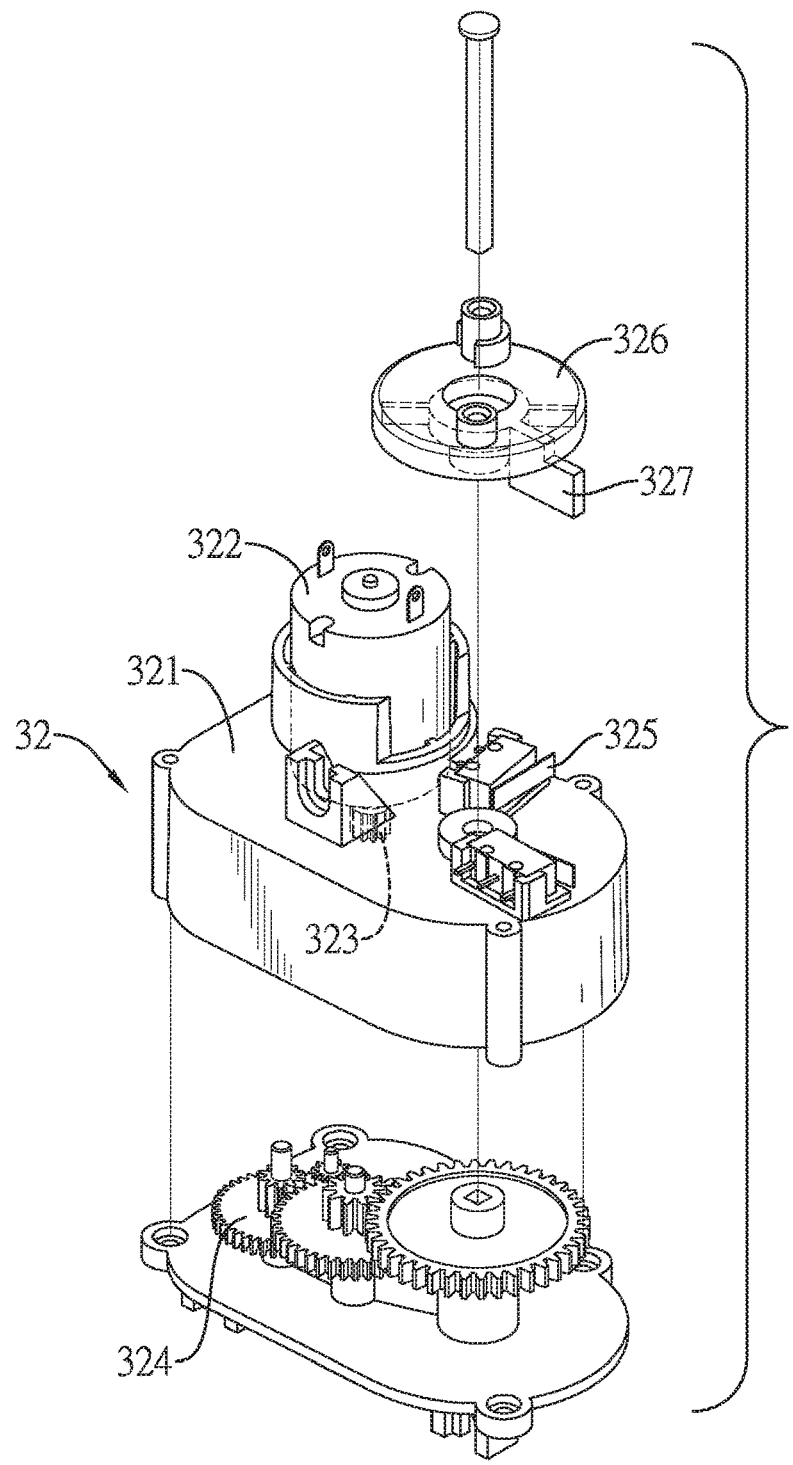
FIG. 4 is an enlarged exploded perspective view of the driving assembly of the projector in FIG. 1.
Figure 7:
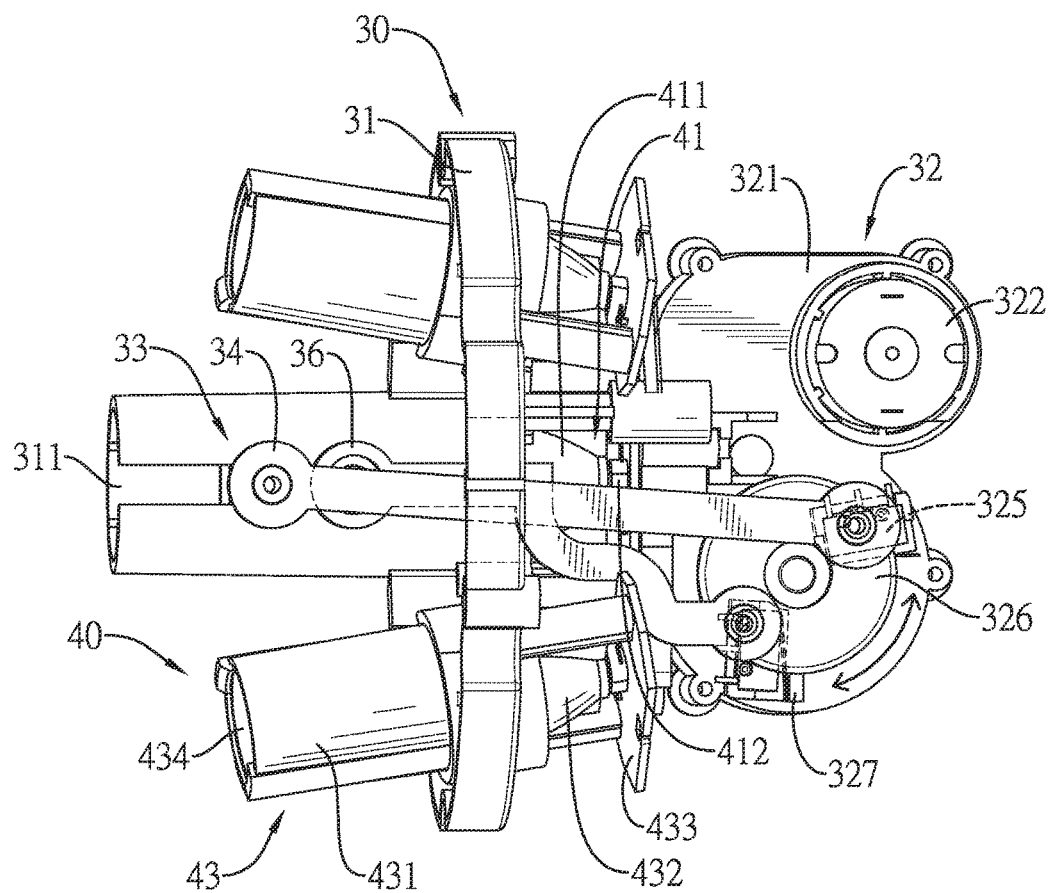
FIG. 7 is an enlarged side view of the driving assembly of the projector in FIG. 1.

FIGS. 4, 5, and 7 show the original positions of the front base 35 and the rear base 37. An electrical wire 70 is inserted into the housing 11 and is electrically connected with the control device 20, such that alternating current (AC) can be led to the power supply circuit board 22 of the control device 20 via the electrical wire 70. The power supply circuit board 22 will convert the AC to direct current (DC) and supply the DC to the driving assembly 30 and the light device 40. Consequently, the driving device 322 is actuated to operate, and the rotating axle 323 is rotated. The eccentric wheel 326 is rotated by the transmission of the gear assembly 324, and the front base 35 and the rear base 37 are driven to move away from each other via the transmission of the upper lever 34 and the lower lever 36.

When the light device 40 is powered up, the control board 23 can control the main light unit 41 and the auxiliary light units 43 to emit light. The light emitted from the auxiliary light elements 433 will enter the lens sleeve 431 via the light-concentrating shade 432, such that an image can be projected via the image lens 434 in the lens sleeve 431. The light emitted from the main light element 412 will enter the central tube 311 via the pattern film 42 and pass through the front lens on the front base 35 and the rear lens on the rear base 37. With the movement of the front base 35 and the rear base 37 away from each other, the dimensions of the projected image via the pattern film 42 will become larger, such that the dimensions of the projected image are various as a firework.

When the eccentric wheel 326 rotates to a position where the pushing tab 327 abuts one of the limiting switches 325, the limiting switch 325 that is abutted will control the driving device 322 to rotate in reverse. At this time, the control board 23 will turn off the main light unit 41 and control the auxiliary light units 43 to emit light intermittently. With the reverse rotation of the driving device 322, the front base 35 and the rear base 37 are driven to approach each other via the transmission of the eccentric wheel 326 and the upper lever 34 and the lower lever 36. When the pushing tab 327 abuts the other limiting switch 325, the front base 35 and the rear base 37 are moved to the original positions. Consequently, the projector can be operated repeatedly.

With reference to FIGS. 3, 5, and 8, the control device 20 can control the speaker 51 of the sound device 50 to generate sound based on the image projected by the main light unit 41. The control knob 52 can control the volume of the sound generated by the speaker 51. Accordingly, the projector in accordance with the invention can simulate an explosion of a firework.

When the supporting device 60 is a tripod, the supporting device 60 can be expanded and stand on the ground. When the supporting device 60 is a ground insert, the supporting device 60 can be inserted into the ground. Accordingly, the projector can be used outdoors. In addition, different images can be projected by changing pattern films 42 having different patterns, such that the projector in accordance with the present invention is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projector comprising:
   a body comprising
      a housing having a chamber defined in the housing and an opening defined in the housing and communicating with the chamber; and
      a cover being transparent and attached to the housing to close the opening;
   a control device mounted in the chamber of the housing;
   a driving assembly mounted in the chamber of the housing and comprising
      a holding frame mounted in the chamber of the housing and having a central tube formed on the holding frame;
      a driving unit mounted on the holding frame, electrically connected with the control device, and having
      a casing mounted on the holding frame;
      a driving device mounted on the casing and electrically connected with the control device;
      a rotating axle rotatably connected with the driving device and having multiple teeth formed around the rotating axle;
      a gear assembly mounted in the casing and engaged with the teeth on the rotating axle; and
      two limiting switches mounted on an outer surface of the casing and electrically connected with the control device;
      an eccentric wheel rotatably mounted on the outer surface of the casing, connected with the gear assembly, and having a pushing tab mounted on the eccentric wheel and being selectively in contact with the two limiting switches; and
      a transmitting unit mounted on the holding frame and comprising
         an upper lever connected with the eccentric wheel;
         a front base connected with the upper lever, held moveably in the central tube of the holding frame, and having a front lens;
         a lower lever connected with the eccentric wheel; and
         a rear base connected with the lower lever, held moveably in the central tube of the holding frame, and having a rear lens;
   a light device mounted on the holding frame, electrically connected with the control device, and comprising
      a main light unit mounted on the holding frame and aligned with the central tube;
      a pattern film disposed between the main light unit and the central tube; and
      multiple auxiliary light units mounted on the holding frame at spaced intervals and arranged around the main light unit.

2. The projector as claimed in claim 1 further comprising a sound device mounted on a rear end of the body, electrically connected with the control device, and comprising
   a speaker mounted in the chamber of the housing; and
   a control knob electrically connected with the speaker and protruding out of the housing.

3. The projector as claimed in claim 2, wherein the control device comprises
   a power supply box mounted in the housing;
   a power supply circuit board mounted in the power supply box and electrically connected with the driving unit, the light device, and the sound device; and
   a control board mounted in the housing and electrically connected with the light device and the sound device.

4. The projector as claimed in claim 1 further comprising a supporting device mounted on a bottom of the housing.

5. The projector as claimed in claim 2 further comprising a supporting device mounted on a bottom of the housing.

6. The projector as claimed in claim 3 further comprising a supporting device mounted on a bottom of the housing.

7. The projector as claimed in claim 6, wherein the main light unit comprises
   a main light shade mounted on the holding frame; and
   a main light element mounted on the main light shade and aligned with the central tube.

8. The projector as claimed in claim 7, wherein each auxiliary light unit comprises
   a lens sleeve mounted through the holding frame and having an image lens;
   a light-concentrating shade mounted on the lens sleeve; and
   an auxiliary light element mounted on the light-concentrating shade and aligned with the lens sleeve.

9. The projector as claimed in claim 5, wherein the main light unit comprises
   a main light shade mounted on the holding frame; and
   a main light element mounted on the main light shade and aligned with the central tube.

10. The projector as claimed in claim 9, wherein each auxiliary light unit comprises
    a lens sleeve mounted through the holding frame and having an image lens;
    a light-concentrating shade mounted on the lens sleeve; and
    an auxiliary light element mounted on the light-concentrating shade and aligned with the lens sleeve.

11. The projector as claimed in claim 4, wherein the main light unit comprises
    a main light shade mounted on the holding frame; and
    a main light element mounted on the main light shade and aligned with the central tube.

12. The projector as claimed in claim 11, wherein each auxiliary light unit comprises
    a lens sleeve mounted through the holding frame and having an image lens;
    a light-concentrating shade mounted on the lens sleeve; and
    an auxiliary light element mounted on the light-concentrating shade and aligned with the lens sleeve.

13. The projector as claimed in claim 3, wherein the main light unit comprises
    a main light shade mounted on the holding frame; and
    a main light element mounted on the main light shade and aligned with the central tube.

14. The projector as claimed in claim 13, wherein each auxiliary light unit comprises
    a lens sleeve mounted through the holding frame and having an image lens;
    a light-concentrating shade mounted on the lens sleeve; and
    an auxiliary light element mounted on the light-concentrating shade and aligned with the lens sleeve.

15. The projector as claimed in claim 2, wherein the main light unit comprises
   a main light shade mounted on the holding frame; and
   a main light element mounted on the main light shade and aligned with the central tube.

16. The projector as claimed in claim 15, wherein each auxiliary light unit comprises
   a lens sleeve mounted through the holding frame and having an image lens;
   a light-concentrating shade mounted on the lens sleeve; and
   an auxiliary light element mounted on the light-concentrating shade and aligned with the lens sleeve.

17. The projector as claimed in claim 1, wherein the main light unit comprises
   a main light shade mounted on the holding frame; and
   a main light element mounted on the main light shade and aligned with the central tube.

18. The projector as claimed in claim 17, wherein each auxiliary light unit comprises
   a lens sleeve mounted through the holding frame and having an image lens;
   a light-concentrating shade mounted on the lens sleeve; and
   an auxiliary light element mounted on the light-concentrating shade and aligned with the lens sleeve.

19. The projector as claimed in claim 6, wherein each auxiliary light unit comprises
   a lens sleeve mounted through the holding frame and having an image lens;
   a light-concentrating shade mounted on the lens sleeve; and
   an auxiliary light element mounted on the light-concentrating shade and aligned with the lens sleeve.

20. The projector as claimed in claim 1, wherein each auxiliary light unit comprises
   a lens sleeve mounted through the holding frame and having an image lens;
   a light-concentrating shade mounted on the lens sleeve; and
   an auxiliary light element mounted on the light-concentrating shade and aligned with the lens sleeve.

* * * * *